United States Patent [19]

Goodboy

[11] 4,364,858
[45] Dec. 21, 1982

[54] METHOD OF PRODUCING AN ACTIVATED ALUMINA CLAUS CATALYST

[75] Inventor: Kenneth P. Goodboy, Pittsburgh, Pa.

[73] Assignee: Aluminum Company of America, Pittsburgh, Pa.

[21] Appl. No.: 170,638

[22] Filed: Jul. 21, 1980

[51] Int. Cl.³ ............................................. B01J 21/04
[52] U.S. Cl. ..................................... 252/463; 423/628
[58] Field of Search .................. 252/463; 423/576, 628

[56] References Cited

U.S. PATENT DOCUMENTS

| | | | |
|---|---|---|---|
| 3,725,531 | 4/1973 | Pearson et al. | 423/244 |
| 3,845,197 | 10/1974 | Renault et al. | 423/575 |
| 3,978,004 | 8/1976 | Daumas et al. | 252/462 |
| 4,051,072 | 9/1977 | Bedford et al. | 252/463 X |
| 4,054,642 | 10/1977 | Daumas et al. | 423/574 R |
| 4,141,962 | 2/1979 | Dupuy et al. | 423/571 |

OTHER PUBLICATIONS

Pechiney-Saint-Gobain, Product Data on DR Catalyst.
Kaiser Chemicals Product Data on S-501 Alumina.
Kaiser Chemicals Product Data on S-201 Alumina.
Kaiser Chemicals Product Data on S-701 Alumina.

Primary Examiner—W. J. Shine
Attorney, Agent, or Firm—Glenn E. Klepac

[57] ABSTRACT

An improved Claus catalyst is provided in the form of activated alumina in which sodium oxide concentration, LOI and surface area of the catalyst are carefully controlled to achieve increased sulfur conversion. Sulfur recovery is enhanced by choosing an alumina catalyst having properties which minimize chemisorption of sulfur dioxide on the catalyst at reaction conditions. Sodium oxide may be present in an amount of 0.1 to 2.5 wt % of the catalyst (1100° C. calcined basis). The catalyst desirably has a surface area greater than 100 $m^2/g$ (BET) and an LOI (hydroxyl content as determined by heating from 400° to 1100° C.) between 2.0 and 6.0 wt %. A method of producing the catalyst and a method of using the catalyst are also provided.

6 Claims, 3 Drawing Figures

COS CONVERSION AS A FUNCTION OF TEMPERATURE

METHOD OF PRODUCING AN ACTIVATED ALUMINA CLAUS CATALYST

BACKGROUND OF THE INVENTION

This invention relates to an improved Claus catalyst and methods for making such a catalyst. More particularly, it provides an improved Claus catalyst made from activated alumina and sodium oxide; the catalyst possesses increased resistance to sulfate poisoning and higher catalytic activity with respect to compounds such as $H_2S$, $SO_2$, COS and $CS_2$ than the catalysts of the prior art.

Many industrial fuels contain sulfur compounds which are toxic, corrosive and produce sulfur dioxide when burned. It is necessary, therefore, to remove these sulfurous materials for economic and ecological reasons prior to utilization of the fuel. In the case of crude oil, for example, the oil is typically subjected to hydrodesulfurization (i.e. treatment with hydrogen and a cobalt-molybdenum on alumina catalyst) to produce hydrogen sulfide in conjunction with ammonia, water and diluents. In the case of sour natural gas, hydrogen sulfide and carbon dioxide are usually present in concentrations which can be removed by coventional sweetening processes such as those described in C. D. Swaim, Jr's. article entitled "Gas Sweetening Processes of the 1960's", found in *Hydrocarbon Processing*, 49(3), 127 (1970). Sweetened sour natural gas by-products and the off-gas from hydrodesulfurization of crude oil are each rich in hydrogen sulfide and may be used, therefore, as feed gases for the well-known Claus process. Basically, in the Claus process, one-third of the total hydrogen sulfide present in the gas to be treated is burned in a furnace with air to produce sulfur dioxide at temperatures between 900° and 1200° C. The remaining two-thirds of the hydrogen sulfide react on the catalyst at temperatures of 200° to 400° C. with the sulfur dioxide so produced to form sulfur and water vapors. A low temperature Claus process is used to condense sulfur on the catalyst at temperatures of about 25° to 200° C. However, at high furnace temperatures, side reactions in which COS and $CS_2$ are formed also occur. These carbon-sulfur compounds may be removed by catalytic reaction with sulfur dioxide to form carbon dioxide and sulfur and to a lesser degree by catalytic reaction with water vapor to form carbon dioxide and hydrogen sulfide.

Although the amount of COS and $CS_2$ formed by high temperature side reactions may only amount to a few percent of the sulfurous material present in the emitting furnace gas, increasingly more stringent air regulations make their removal from the gas necessary. Conversion of these carbon-sulfur compounds to sulfur is difficult, however, because of their slow reaction rates. Further, the optimum reaction conditions for each of the carbon-sulfur compounds differ significantly. Removal of these organic sulfur compounds is also complicated by the fact that the presence of sulfurous gas inhibits hydrolysis of the carbon derivatives of sulfur, and, as already indicated, it is believed that hydrolysis is partially responsible for conversion of these carbon-sulfur compounds. Therefore, only the most active of catalysts would be capable of removing these organic sulfur compounds after sulfate formation from sulfur dioxide. Considerable efforts to find such an extraordinarily active catalyst have been exerted in the past few years. Renault et al. (U.S. Pat. No. 3,845,197) describes a process of first reacting the gas stream containing carbon-sulfur compounds such as COS and $CS_2$ with steam while passing the gas stream over an alumina-containing catalyst at 250° to 400° C. to produce $H_2S$. A portion of the $H_2S$ produced is then oxidized at 300° to 500° C. to produce $SO_2$ in an amount sufficient to establish a ratio of $H_2S$ to $SO_2$ of 1.6 to 3. The $SO_2$ is then reacted with the remaining portion of $H_2S$ at 20° to 160° C. to produce elemental sulfur. The catalyst used by Renault et al. to produce the $H_2S$ is alumina in which one or more metals such as molybdenum, tungsten, iron, nickel or cobalt, may be present as oxides. The catalyst has an alkali metal content lower than 0.1%, a specific surface area of 40 to 500 $m^2/g$ and a pore volume of 10 to 80 cc/100 g. Oxidation of the $H_2S$ to $SO_2$ is then carried out in the presence of a second catalyst (i.e. oxidation catalyst) which may be alumina in which chromium, vanadium, iron or mixtures thereof are present. The oxidized gas stream is then contacted at 20° to 160° C. with an organic solvent which contains a catalyst favoring the reaction between $H_2S$ and $SO_2$. The catalyst described as useful in this stage of the treatment is an alkali metal compound. The Renault et al approach divides the gas treatment into three separate stages with a different catalyst for each of these stages. Such a detailed procedure is both expensive and difficult to use in a commercial operation.

Pearson et al. (U.S. Pat. No. 3,725,531) discloses a less complicated process for treating off-gases containing organic sulfur compounds in which the off-gas is contacted with an alumina base catalyst to convert the organic sulfur materials to carbon dioxide and elemental sulfur. The catalysts described as useful in the practice of the Pearson et al. process include an alumina base support in combination with at least one metal selected from strontium, calcium, magnesium, zinc, cadmium, barium and molybdenum. These catalysts, it is claimed, have a high resistance to sulfate poisoning, i.e. the buildup of sulfate on the surface of the catalyst due to oxidation of sulfur dioxide on the active sites of the catalyst employed. Pearson et al. state that suitable alumina base supports for the catalyst include activated bauxite, activated aluminas possessing an essentially chi-rho structure, calcined Bayer hydrate, calcined gel-derived aluminas containing a substantial portion of pseudoboehmite and gamma alumina. It is the promoter (i.e. Ca, Mg, Cd, etc.), however, which acts as an antipoisoning agent to provide increased alumina resistance to sulfate poisoning. However, the amount of antipoisoning agent included in the catalyst, and consequently the effectiveness of the Pearson et al. catalyst, is substantially dependent upon economy of manufacture.

Daumas et al. also disclose improved Claus catalysts in U.S. Pat. Nos. 3,978,004, 4,054,642 and 4,141,962 in which an activated alumina comprises the largest component. In U.S. Pat. No. 3,978,004, the activated alumina is combined with a compound of lanthanum, a lanthanide series metal of atomic number 58 to 71 or a metal of Group IIIB. In U.S. Pat. No. 4,054,642, the alumina is combined with a metal of Group IIIA of the periodic chart. And in U.S. Pat. No. 4,141,962, the alumina is combined with a titanium compound. These promoters (like the Pearson et al promoters) are rather esoteric solutions to the problem of sulfate poisoning of the catalyst. Though a variety of promoters have been tried, there still exists a need for an alumina Claus catalyst which is highly resistant to sulfate poisoning.

In view of the above-discussed problems, it would be particularly advantageous to have available a Claus catalyst which is highly resistant to sulfate poisoning, is relatively cheap to make (i.e. requires no expensive promoter), increases catalytic activity and requires no complication of the standard Claus conversion procedure.

SUMMARY OF THE INVENTION

It is an object of the present invention to provide an improved Claus catalyst which is highly resistant to sulfate poisoning.

It is also an object of the present invention to provide an improved Claus catalyst which is highly resistant to sulfate poisoning, may be used in existing Claus converters and is economical to produce.

These and other objects which will become apparent to those skilled in the art are accomplished by providing an activated alumina catalyst in which sodium oxide concentration, LOI and surface area of the catalyst are controlled to achieve increased sulfur conversion. Sodium oxide may be present in the catalyst in an amount greater than 0.1 wt % on an 1100° C. calcined basis and may be greater than 0.5 wt %. The chemical nature of the sodium compounds present in the catalysts is difficult to specify under the conditions of use, so in practice, it is preferable to relate the proportions of these compounds to that of sodium oxide. The catalyst desirably has a specific surface area greater than 100 $m^2/g$ (BET) and an LOI (hyroxyl content determined by heating from 400° to 1100° C.) of less than 6.0 wt % and may be less than 4.0 wt %.

DETAILED DESCRIPTION OF THE PREFERRED EMBODIMENT

Figure 1:
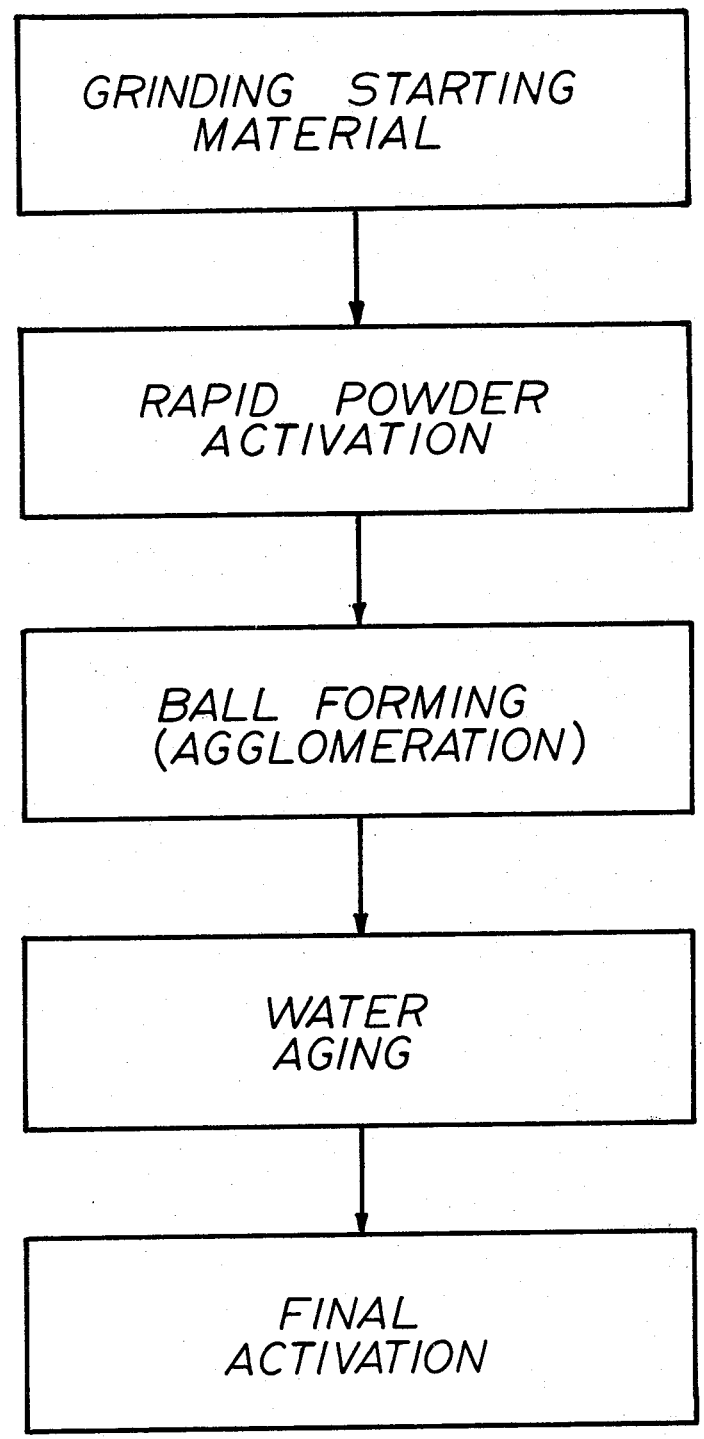
FIG. 1 is a flow chart which indicates the steps of the preferred method for making the catalyst of the present invention.

The Claus catalyst of the present invention is an activated alumina in which sodium oxide is present in significant amounts, i.e. in amounts in excess of 0.1 wt % of the catalyst. The sodium oxide content of the catalyst is preferably between 0.1 and 2.5 wt %, with 0.50 to 2.5 wt % (on an 1100° C. calcined basis) being the most preferred range. The catalyst of the present invention also has an LOI (hydroxyl content determined by heating from 400° to 1100° C.) less than the 6.0 wt % of typical prior art catalysts, with 2.0 to 4.0 wt % being the most preferred range. Another important feature of the catalyst of the present invention is surface area. High surface area, i.e. surface area greater than 100 $m^2/g$ (BET), is desirable with a surface area greater than 300 $m^2/g$ (BET) being particularly beneficial.

It has been found that each of these features, i.e. sodium oxide content, LOI and surface area, may be controlled singly or in combination in a manner such that sulfur dioxide chemisorption upon the catalyst can be significantly reduced without requiring expensive refining of the starting alumina. It has been determined that sulfur dioxide chemisorption under typical Claus reaction conditions proceeds in accordance with the equation:

$$CS = 0.00838A + 0.466L - 0.856N - 1.04 \pm 0.17 \qquad (1)$$

where CS is chemisorption expressed as grams $SO_2$ per 100 grams $Al_2O_3$; A is the catalyst surface area in $m^2/g$; L is the percent hydroxyl content determined by heating from 400° to 1100° C.; and N is the percent sodium oxide on an 1100° C. calcined basis.

This equation expresses a surprising relationship between the variables of surface area, LOI and sodium oxide. In order to achieve low $SO_2$ chemisorption, the above equation indicates that a low LOI and/or high sodium oxide content are beneficial. For sodium oxide the opposite was thought to be true. For example, low sodium oxide content was believed to be desirable by those skilled in the art because it was expected that sodium oxide would react with sulfur dioxide to cause weight gain and chemisorption of $SO_2$ due to formation of sodium sulfite and/or sodium sulfate. Such chemisorption would be expected to reduce available surface area of the catalyst and consequently decrease the sulfur conversion of capability of the catalyst. Contrary to this expectation, significant amounts of sodium oxide are not only tolerable to a Claus catalyst, but, in fact, are beneficial because, within certain limits, sodium oxide retards chemisorption of $SO_2$.

With respect to surface area, it is well established that the greater the surface area of a catalyst, the more active the catalyst. In view of Equation (1), however, surface area is not as significant a feature as either LOI or sodium oxide content. In fact, the proportion of the Y-variance (wt % $SO_2$ chemisorbed) correlated by Equation (1) due to surface area is only 22.9%, whereas, the proportion of the Y-variance attributable to LOI and sodium oxide content is 39.2% and 34.2%, respectively.

Figure 2:
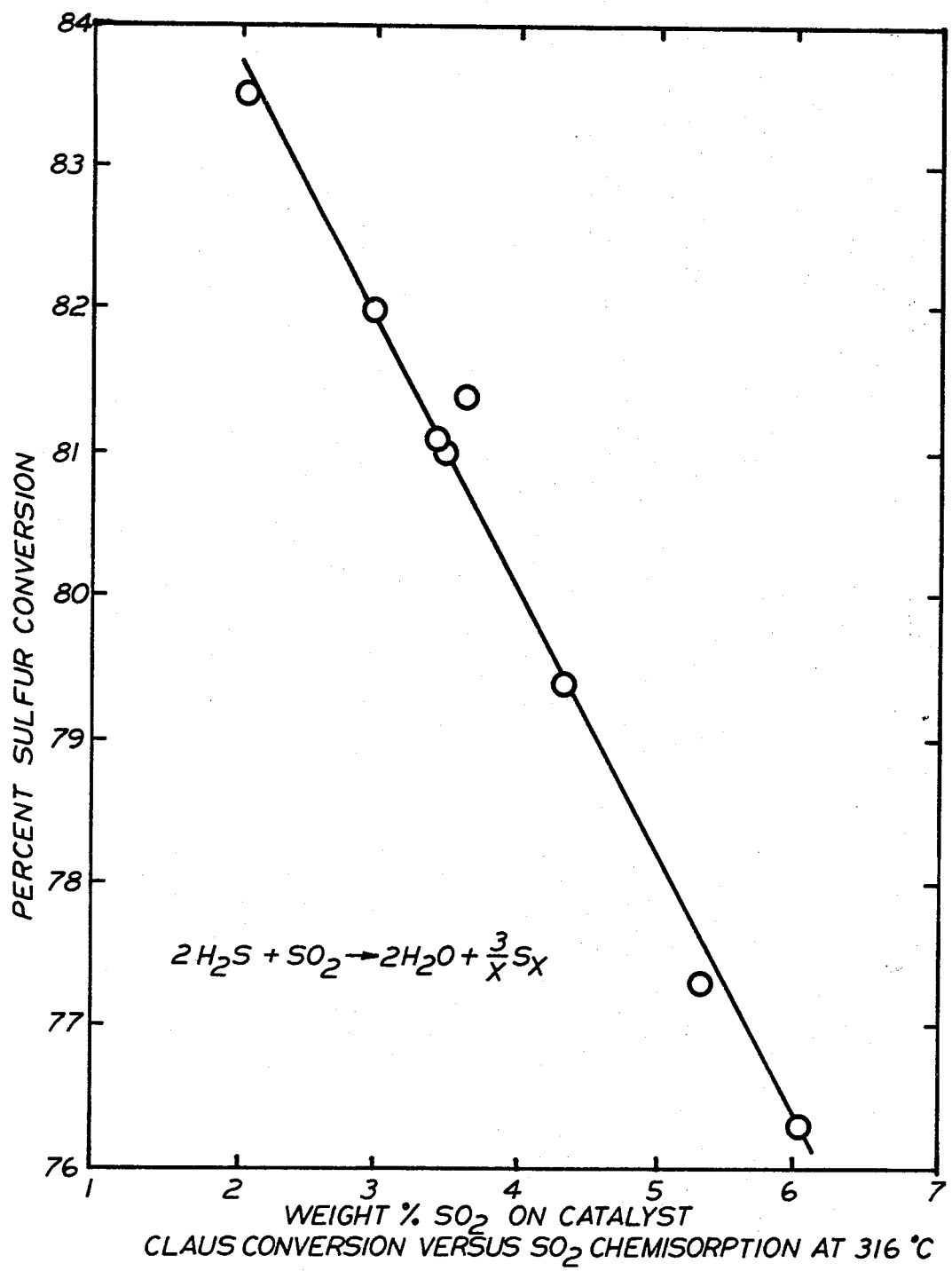
FIG. 2 is a graph in which percent sulfur conversion is plotted against weight percent $SO_2$ chemisorbed on the catalyst of the present invention at 316° C.

That low chemisorption of $SO_2$ is desirable is shown in the graph of FIG. 2. FIG. 2 relates percent sulfur conversion to wt % of $SO_2$ chemisorbed on the catalyst and shows that at 316° C. (a temperature which is typical in a Claus catalytic reactor), the reaction

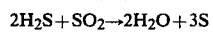

proceeds to almost 84% completion (i.e. formation of S) when the catalyst has 2 wt % (on catalyst) $SO_2$ chemisorbed thereon. When the wt % $SO_2$ chemisorbed on the catalyst is 4 wt %, however, only 80% sulfur conversion is achieved. The Claus conversion efficiency (as indicated by percent sulfur conversion) decreases linearly with increasing $SO_2$ weight gain on the catalyst over the range studied.

One method for making the catalyst of the present invention is outlined by the flow chart in FIG. 1. It can be seen from the flow chart that a suitable starting material (such as Bayer trihydrate) is ground. An average particle size of approximately 10 microns or less has been found to be desirable. Appropriate grinding techniques are well known to those in the art. After grinding, the particles are rapidly activated by exposure to relatively high temperatures for a brief period of time (i.e. less than one minute). The thus activated particles are then ball formed (i.e. agglomerated) in the presence of water and then aged for a period of time such as two hours. The aged material is then activated by subjecting it to a temperature of 350° to 900° C. for a period of 30 minutes to four hours, with the shorter times being used at higher temperatures. Temperatures of 400° to 500° C. for approximately two to four hours would be typical activation conditions. The activated material is then ready for use in a Claus converter.

Starting materials suitable for the practice of the present invention include pseudoboehmite, Bayer trihydrate or gibbsite, bayerite and any other form of alumina which when properly treated yields an alumina catalyst having a sodium oxide concentration of 0.10 to 2.5 wt % (1100° C. calcined basis), an LOI (hyroxyl content determined by heating from 400° to 1100° C.) of 2.0 to 6.0 wt %, and a surface area of 100 to 500 m$^2$/g (BET). With respect to sodium oxide concentration as a consideration in the choice of a starting material, it has been found that Bayer trihydrate, i.e. the product of the Bayer process, is a particularly advantageous starting material because the relatively high Na$_2$O concentration required in the catalyst of the present invention can be easily achieved. In the Bayer process, bauxite is treated with sodium hydroxide under pressure to form a sodium aluminate solution. The sodium aluminate solution is decomposed and seeded with previously formed hydrate. The hydrate thus formed is then washed with water and dried. A typical Bayer hydrate contains 0.4 wt % of sodium oxide in its crystal lattice, but this concentration may be lowered or raised by use of special temperature conditions and seed charges. Additionally, the sodium oxide content of Bayer alumina may be increased simply by washing the precipitate from the sodium aluminate solution with less water. This decreased washing represents a significant cost saving.

Where the starting material is pseudoboehmite made by rapid neutralization of NaAlO$_2$ by acids or acidic aluminum salts, the sodium oxide concentration of the pseudoboehmite may be increased by using less wash and repulp water (a dispersion medium) or by adding Na$_2$SiO$_3$ solution to the NaAlO$_2$ solution to form sodium zeolite prior to neutralization of the NaAlO$_2$ by addition of acid to the NaAlO$_2$ solution. Sodium zeolite powder or any other sodium source may also be added to activated alumina by ball forming (agglomerating) the mixture to produce an alumina having increased sodium oxide content. The addition of sodium zeolite has the added advantage that the SiO$_2$ (silica) in the sodium zeolite can contribute to thermal stability of the Claus catalyst to temperatures of about 500° C. Another method for increasing sodium oxide content of the alumina catalyst is to impregnate activated alumina with sodium hydroxide or some other sodium salt. For the latter method, however, it is necessary to take measures to assure that the pores of the catalyst are not blocked off. Other methods for increasing sodium oxide content will be apparent to those skilled in the art.

The starting material of the present invention may have particles having a particle size of 75 microns or larger. These particles should be ground to a particle size of about 10 microns or less to achieve a particularly advantageous Claus catalyst. Any grinding techique known to those skilled in the art may be used.

Once the alumina starting material has an average particle size of approximately 10 microns or less, the alumina is rapidly activated by exposure to high temperature for a brief period of time. Methods for such rapid activation are well known in the art. One technique which has been found to be particularly useful is that described in U.S. Pat. No. 2,915,365. In accordance with this patented disclosure, alumina trihydrate is injected into a stream of highly heated gases (e.g. air) at gas temperatures of greater than 300° C., such as 300° to 1000° C., with 300° to 400° C. being the preferred range. The duration of contact between the alumina trihydrate and the hot gas may be less than one minute, such as from a fraction of a second to several seconds, with two to three seconds being the preferred contact time. The alumina, once activated, is in the gamma phase. If the hydrate were not ground prior to rapid activation, crystalline boehmite would be present in the activated powder. The presence of boehmite is undesirable because it increases the hydroxyl content (indicated by LOI) of the activated alumina.

In a preferred embodiment of the present invention, the rapidly activated alumina is ball formed (agglomerated) in the presence of water and then steam and water aged for a maximum of six hours at 60° to 80° C. and at pH's greater than 7. At high aging temperatures, greater than 80° C., undesirable boehmite is formed in the alumina phase.

The above-described aging step is important to strength development and the alumina phase chemistry of the agglomerates prior to activation. Aging is the recrystallization of activated (gamma) alumina back to the aluminum hydroxide phases of pseudoboehmite, boehmite, bayerite or gibbsite. Certain properties of the final activated product, including crushing strength and microstructural properties, are related to the extent of recrystallization or rehydration and also to the type and degree of crystallinity.

For example, any of three types of aging may be used by those skilled in the art: (1) natural, (2) steam and (3) water immersion. For natural aging, the agglomerates are stored in moisture tight containers, and the water in the agglomerate is permitted to rehydrate some of the gamma alumina. Addition of water to a closed hot container of agglomerates is known as steam aging and allows for additional rehydration. In immersion aging the agglomerates are immersed into an aqueous medium. Immersion aging allows maximum rehydration of gamma alumina to the hydroxides.

The aged alumina may then be activated by any of a number of methods known to those skilled in the art. One method which yields a good activated alumina is to expose the aged alumina to a temperature in the range of 350° to 900° C. for a period of 30 minutes to about four hours, with temperatures of 400° to 500° C. for two to four hours being typical conditions. Proper final activation, like powder activation and ball aging of the agglomerates, is important in developing a Claus catalyst with low LOI but high surface area. This activated alumina may then be used in a standard Claus converter.

The activated alumina of the present invention may also be used as a catalyst base (support) to which small quantities of compounds known to enhance specific properties of the catalyst may be added. Such additives include compounds of molybdenum, cobalt, nickel, iron, uranium, calcium, zinc, titanium and others known to those skilled in the art.

Catalysts according to the invention can be used in a fixed or mobile bed or fluid bed or with aerial suspension, the dimensions of the constituent grains being adapted to the particular situation.

Having thus described my invention, the following examples may be helpful in developing a better understanding thereof.

EXAMPLE 1

Activated alumina having the properties listed below was tested in a bench Claus converter:

| | |
|---|---|
| $Al_2O_3$ (400 to 1100° C.) | 92.2 wt % |
| $Na_2O$ (400 to 1100° C.) | 1.00 wt % |
| LOI (400 to 1100° C.) | 6.58 wt % |
| Surface area | 264 $m^2/g$ (BET) |

When starting up the bench scale Claus catalytic converter, it was unexpectedly discovered that the activated alumina catalyst gained weight while the reactor was above the sulfur dewpoint. The weight gain is attributable to $SO_2$ chemisorption on the catalyst.

In this particular experiment, the activated alumina catalyst was placed in the reactor and purged with oxygen-free, dry nitrogen at 316° C. for 16 hours. This procedure stabilized the activated alumina surface area and weight and removed all adsorbed $H_2O$ and $O_2$. The reactor was then purged with pure sulfur dioxide at a space velocity of 200 $hr^{-1}$, and the weight gain was measured as a function of time at 316° C. The results were as follows:

| Cumulative Minutes | $g\ SO_2$ / 100 g Catalyst | % of Total Wt. Gain |
|---|---|---|
| 0 | 0 | 0 |
| 15 | 2.84 | 81.8 |
| 30 | 2.96 | 85.3 |
| 45 | 3.10 | 89.3 |
| 60 | 3.17 | 91.4 |
| 90 | 3.34 | 96.3 |
| 120 | 3.44 | 99.1 |
| 150 | 3.44 | 99.1 |
| 180 | 3.47 | 100.0 |
| 210 | 3.47 | 100.0 |

It can be seen that a major portion of the weight gain was achieved in a relatively short time, but three hours was chosen as the standard reference sorption time. A nitrogen purge at 316° C. for several hours did not decrease the weight gain, thus indicating the adsorption was not merely physical adsorption but chemisorption.

The grams $SO_2$ chemisorbed at 316° C. per 100 grams of catalyst was correlated by the following equation:

$$CS = 0.00838A + 0.466L - 0.856N - 1.04$$

where, CS is chemisorption expressed as grams $SO_2$ per 100 grams $Al_2O_3$; A is the catalyst surface area in $m^2/g$ (BET); L is wt % loss on ignition from 400° to 1100° C.; and N is the wt % $Na_2O$ present (1100° C. basis). The predicted values corresponded to the measured values within ±0.17.

Percent sulfur conversion was then calculated in accordance with the equation:

$$\%\ S\ conversion = 87.5 - 1.86(SO_2)$$

where $SO_2$ is the wt % $SO_2$ chemisorbed on the catalyst. This calculated value exactly corresponded with the measured value of 81.0% sulfur conversion.

EXAMPLES 2-9

Samples of activated alumina in which various surface area, LOI and wt % $Na_2O$ values were employed were tested in the same manner as Example 1. The results are summarized in Table I below.

TABLE I

| Example | $g\ SO_2$ / 100 g $Al_2O_3$ Actual | $g\ SO_2$ / 100 g $Al_2O_3$ Predicted | S.A., $m^2/g$ | 400–1100° C. LOI, wt % | 1100° C. Basis $Na_2O$, wt % | Predicted % S Conversion* |
|---|---|---|---|---|---|---|
| 2 | 4.49 | 4.29 | 390 | 5.24 | 0.44 | 79.1 |
| 3 | 3.16 | 3.29 | 357 | 5.37 | 1.36 | 81.6 |
| 4 | 3.76 | 3.94 | 332 | 5.50 | 0.43 | 80.5 |
| 5 | 3.73 | 3.76 | 381 | 4.21 | 0.41 | 80.6 |
| 6 | 2.58 | 2.73 | 244 | 3.87 | 0.09 | 82.7 |
| 7 | 2.53 | 2.49 | 363 | 4.91 | 2.10 | 82.8 |
| 8 | 2.62 | 2.46 | 243 | 3.32 | 0.10 | 82.6 |
| 9 | 2.47 | 2.48 | 315 | 2.49 | 0.33 | 82.9 |

*using actual chemisorption values

EXAMPLES 10-16

The relationship between Claus conversion (i.e. conversion to sulfur) and $SO_2$ chemisorption at 316° C. was studied more closely in these examples. The exact operating conditions are shown below. Various samples of activated alumina were used in a standard Claus converter, and the percent sulfur conversion was both measured and calculated by means of the equation discussed above. The results are summarized in Table II and graphically illustrated in FIG. 2.

TABLE II

| Sample Number | Weight % $SO_2$ on Catalyst | % S Conversion Actual | % S Conversion Predicted |
|---|---|---|---|
| 10 | 2.03 | 83.5 | 83.7 |
| 11 | 2.96 | 82.0 | 82.0 |
| 12 | 3.62 | 81.4 | 80.8 |
| 13 | 3.41 | 81.1 | 81.2 |
| 14 | 4.34 | 79.4 | 79.4 |
| 14 | 5.34 | 77.3 | 77.6 |
| 16 | 6.05 | 76.3 | 76.3 |

It can be seen from the data in Table II that the calculated percent sulfur conversion values correspond to those actually measured to ±0.3%.

| | |
|---|---|
| Catalyst temperature | 316° C. |
| $H_2S/SO_2$ ratio | 2.02 |
| GHSV* at 0° C. and 1 atm | 4130 $hr^{-1}$ |
| $N_2$ | 90.26 mole % |
| $H_2S$ | 6.51 mole % |
| $SO_2$ | 3.23 mole % |
| | 100.00 mole % |
| Catalyst | Activated alumina 4–8 mesh (3.57 mm) |
| Reaction $2H_2S + SO_2 \rightarrow$ | $2H_2O + 3/X\ S_x$ |

*GHSV = Gas Hourly Space Velocity

EXAMPLES 17-18

These examples illustrate the effect of reactor temperature upon the conversion of COS to sulfur accomplished when an activated alumina catalyst is used. The test conditions for each of these examples were as follows:

| | |
|---|---|
| Catalyst temperature | 225–400° C. |
| GHSV at 0° C. and 1 atm | 1000 hr$^{-1}$ |
| N$_2$ | 92.35 mole % |
| COS | 1.08 mole % |
| SO$_2$ | 6.57 mole % |
| | 100.00 mole % |
| Catalyst | Activated alumina 12–14 mesh (1.30 mm) |
| Reaction 2 COS + SO$_2$ → | 2 CO$_2$ + 3/X S$_x$ |

The alumina of Example 17 had a surface area of 315 m$^2$/g (BET), an LOI (400° to 1100° C.) of 5.4 wt % and a Na$_2$O content of 0.35 wt %. The sulfur conversion achieved at the various temperatures tested are graphically illustrated in FIG. 3 by the curve labeled 17.

The alumina of Example 18 had a surface area of 315 m$^2$/g (BET), a LOI (400° to 1100° C.) of 2.2 wt % and a Na$_2$O content of 0.35 wt %. The percent sulfur conversion achieved at the temperatures tested is shown graphically in FIG. 3 by the curve labeled 18.

Figure 3:
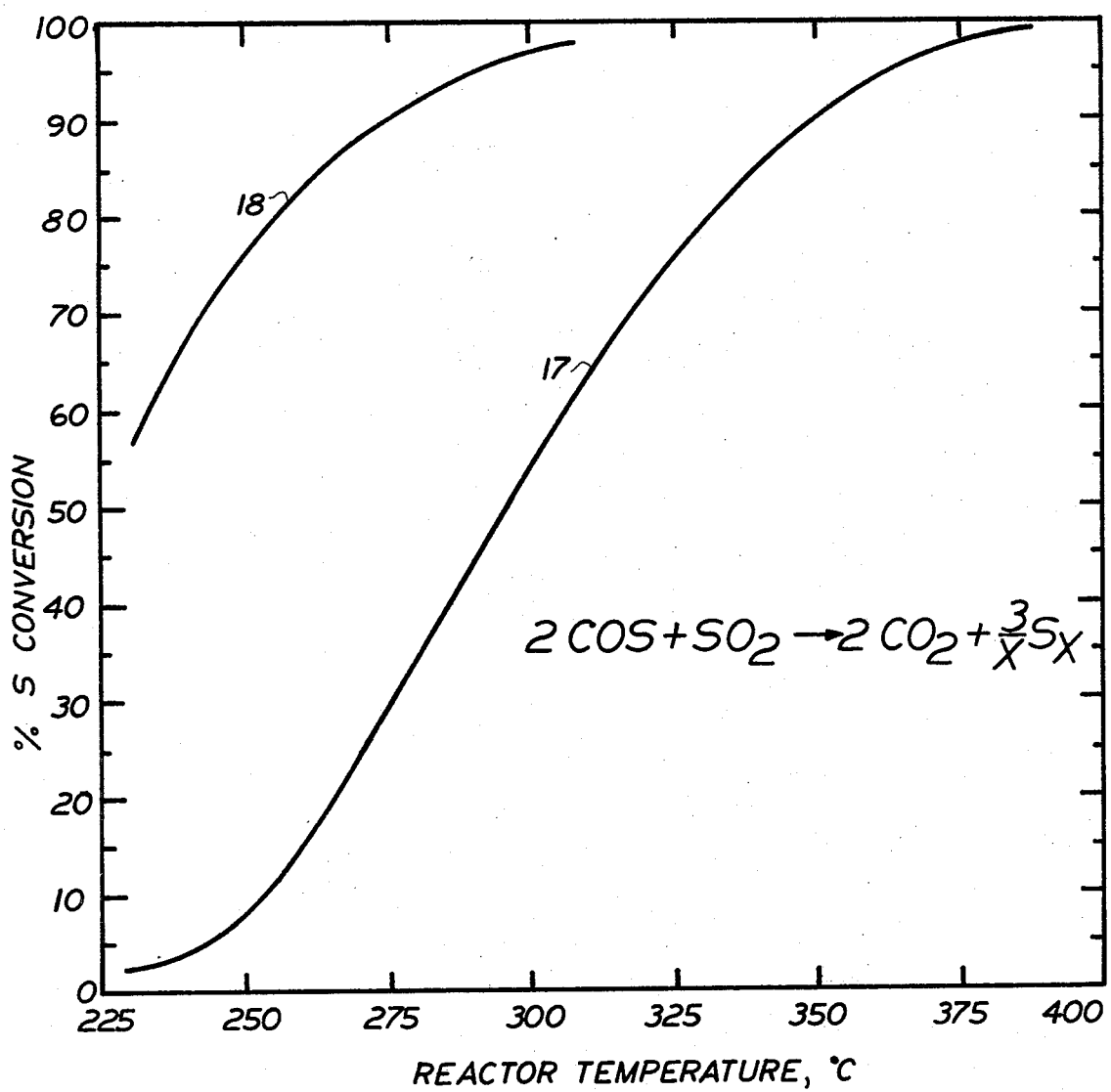
FIG. 3 is a comparative graph in which percent sulfur conversion is plotted against reactor temperature (°C.) at a constant gas space velocity of 1000 $hr^{-1}$. Sulfur conversion accomplished with activated alumina having an LOI (hydroxyl content determined by heating from 400° to 1100° C.) of 2.2 wt % is compared with a catalyst having the same properties with the exception that its LOI (hydroxyl content determined by heating from 400° to 1100° C.) value is 5.4 wt %.

FIG. 3 shows that the activated alumina having a lower LOI (400° to 1100° C.) converts more COS to S at much lower temperatures than an alumina having an LOI (400° to 1100° C.) value of nearly 6.0 wt % which is typical of the alumina currently used in the art. In fact, it can be seen that the activated alumina of Example 18 converts COS to sulfur almost 100% at approximately 300° C., whereas the activated alumina of Example 17 requires a temperature of approximately 375° C. to achieve comparable results.

Having thus described my invention, I claim:

1. A method of producing an activated alumina catalyst suitable for use in a Claus process and having increased resistance to sulfate poisoning and increased catalytic activity, the method consisting essentially of:
   (a) sizing alumina to an average particle size of about 10 microns or less;
   (b) then, rapidly activating the sized alumina particles by exposure to relatively high temperatures of greater than 300° C. for less than one minute;
   (c) agglomerating the activated alumina in the presence of water;
   (d) aging the alumina agglomerates in the presence of water at pH greater than 7 to rehydrate the alumina; and
   (e) activating the aged alumina by exposure to relatively high temperatures from 350° to 900° C., the activated alumina catalyst produced having sodium oxide present in an amount greater than 0.50 wt. % (1100° C. calcined basis), an LOI (400° to 1100° C.) of less than 6.0 wt. % and a specific surface area greater than 100 m$^2$/g (BET).

2. The method of claim 1 which further includes selecting as a starting alumina material, an alumina compound which can be treated to yield an alumina catalyst having sodium oxide in an amount greater than 0.50 wt %.

3. The method of claim 1 which further includes selecting as a starting alumina material, an alumina compound which has a relatively high concentration of sodium compounds.

4. The method of claim 1 wherein sized alumina particles are rapidly activated by exposure to relatively high temperature gas.

5. The method of claim 1 wherein alumina agglomerates are aged by water immersion.

6. A method of producing an activated alumina catalyst suitable for use in a Claus process and having increased resistance to sulfate poisoning and increased catalytic activity, the method consisting essentially of:
   (a) sizing alumina to an average particle size of about 10 microns or less;
   (b) then, rapidly activating the sized alumina particles by exposure to relatively high temperatures of greater than 300° C. for less than one minute;
   (c) agglomerating the activated alumina in the presence of water;
   (d) aging the alumina agglomerates in the presence of water at pH greater than 7 to rehydrate the alumina; and
   (e) activating the aged alumina by exposure to relatively high temperatures from 350° to 900° C., the activated alumina catalyst produced having sodium oxide present in an amount greater than 0.10 wt. % (1100° C. calcined basis), an LOI (400° to 1100° C.) of less than 4.0 wt. % and a specific surface area greater than 100 m$^2$/g (BET).

* * * * *